C. P. FRITZ.
DENTAL SCRAPER.
APPLICATION FILED MAR. 16, 1908.
945,713.
Patented Jan. 4, 1910.
FIG. I.
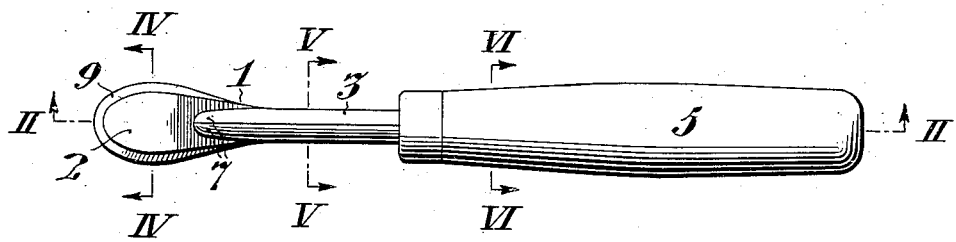
FIG. II.
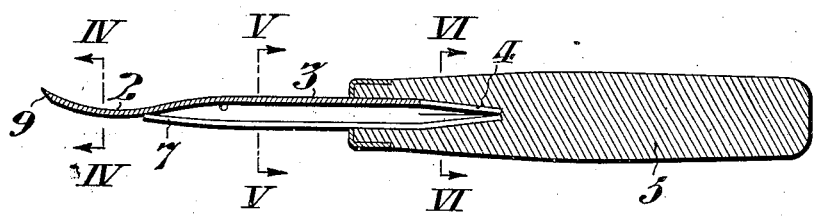
FIG. III.
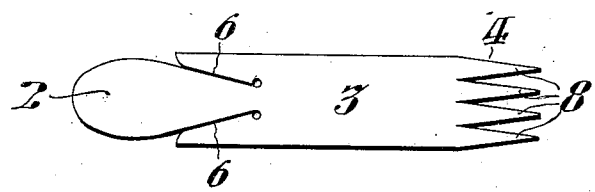
FIG. IV.
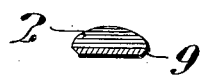
FIG. V.
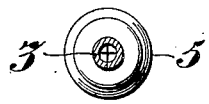
FIG. VI.
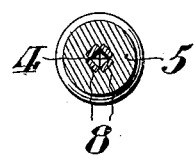
WITNESSES:
Clifton C Hallowell
Morris L Jensen
INVENTOR:
CHARLES P. FRITZ,
by Arthur E. Paige
Atty.

UNITED STATES PATENT OFFICE.

CHARLES P. FRITZ, OF PHILADELPHIA, PENNSYLVANIA.

DENTAL SCRAPER.

945,713.     Specification of Letters Patent.     Patented Jan. 4, 1910.

Application filed March 16, 1908. Serial No. 421,306.

*To all whom it may concern:*

Be it known that I, CHARLES P. FRITZ, of Philadelphia, in the State of Pennsylvania, have invented a certain new and useful Improvement in Dental Scrapers, whereof the following is a specification, reference being had to the accompanying drawing.

My improvement is particularly applicable to implements adapted for scraping vulcanized rubber dentures, and it is the object thereof to form such implements of pressed sheet steel, so that they shall be less costly to manufacture and have more durable cutting edges than if made of cast or forged steel as heretofore.

As hereinafter described, my improved scraper is formed of polished high grade sheet steel, and consequently the manual labor heretofore required for producing a finished surface upon such implements is not required. Moreover, my improved scraper being formed of steel which is of uniform thickness may be uniformly hardened and tempered throughout the extent of the blade, so as to continuously present a durable cutting edge when repeatedly sharpened.

My invention comprises the various novel features of construction and arrangement hereinafter more definitely specified.

In the drawings; Figure I, is a side elevation of an implement embodying my improvement. Fig. II, is a longitudinal sectional view of said implement, taken on the line II, II, in Fig. I. Fig. III, is a plan view of the sheet metal stamping from which the scraper is formed. Fig. IV, is a transverse sectional view, taken on the line IV, IV, in Figs. I and II. Fig. V, is a transverse sectional view, taken on the line V, V, in Figs. I and II. Fig. VI, is a transverse sectional view, taken on the line VI, VI, in Figs. I and II.

In said figures; 1, is the scraping tool comprising the blade 2, and the shank 3, the latter having its tapered tang 4, rigidly secured in the handle 5. Said tool 1, is formed of the flat pressed sheet metal plate cut on the lines 6, 6, to form the braces 7, shown in Figs. I and II, extending back of the blade 2, and supporting the latter against the stress to which it is subjected during the scraping operation.

As shown in Fig. III, the tapered tang 4, is made of pyramidal configuration by serrating the end of said flat sheet metal plate and bending the four pointed projections 8, together, into the converged position shown in Fig. II.

The plate of metal shown in Fig. III, is of uniform thickness throughout its extent, but the blade 2, is beveled at its perimeter 9, conveniently by grinding, so as to form a cutting or scraping edge.

Although I have shown a scraper having a spoon shaped blade curved obliquely to the axis of its shank, it is to be understood that it may be otherwise shaped and bent; it being usual to provide a series of several different sizes and patterns of such tools, for scraping different surfaces.

I do not desire to limit myself to the precise details of construction and arrangement above described, as it is obvious that various modifications may be made therein without departing from the essential features of my invention, as defined in the appended claims.

I claim:—

1. A dental scraper formed of pressed sheet metal comprising a blade and a tubular shank in integral relation with said blade.

2. A dental scraper formed of pressed sheet metal comprising a blade, a tubular shank in integral relation with said blade, and a brace carried by said shank, distinct from said blade, projecting in contact with the latter.

3. A dental scraper formed of pressed sheet metal comprising a blade, a tubular shank in integral relation with said blade, and a brace in integral relation with said shank projecting from the latter in contact with said blade.

4. A scraper formed of pressed sheet metal of uniform thickness comprising a tubular shank provided at one end with a blade having a sharpened perimeter and at the other end with a split tubular tang of pyramidal contour.

In testimony whereof, I have hereunto signed my name at Philadelphia, Pennsylvania, this 24th day of February 1908.

CHARLES P. FRITZ.

Witnesses:
     HOWARD F. GRAYSON,
     GEORGE W. RUE.